(12) United States Patent
Damnjanovic et al.

(10) Patent No.: US 9,369,234 B2
(45) Date of Patent: Jun. 14, 2016

(54) CHANNEL STATE INFORMATION FEEDBACK FOR CARRIER AGGREGATION

(75) Inventors: Jelena M. Damnjanovic, Del Mar, CA (US); Juan Montojo, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 13/208,106

(22) Filed: Aug. 11, 2011

(65) Prior Publication Data

US 2012/0039252 A1    Feb. 16, 2012

Related U.S. Application Data

(60) Provisional application No. 61/374,130, filed on Aug. 16, 2010.

(51) Int. Cl.
  *H04B 17/00*    (2015.01)
  *H04L 1/00*    (2006.01)
  *H04L 5/00*    (2006.01)
  *H04W 72/08*    (2009.01)
  (Continued)

(52) U.S. Cl.
  CPC .............. *H04L 1/0026* (2013.01); *H04L 5/001* (2013.01); *H04L 5/0057* (2013.01); *H04L 5/0091* (2013.01); *H04W 72/085* (2013.01); *H04L 5/1469* (2013.01); *H04W 72/0413* (2013.01)

(58) Field of Classification Search
  None
  See application file for complete search history.

(56) References Cited

U.S. PATENT DOCUMENTS

| | | | |
|---|---|---|---|
| 7,020,110 B2 * | 3/2006 | Walton et al. | 370/334 |
| 2005/0063389 A1 | 3/2005 | Elliott et al. | |
| 2010/0272019 A1 * | 10/2010 | Papasakellariou et al. | 370/328 |

(Continued)

FOREIGN PATENT DOCUMENTS

| | | |
|---|---|---|
| CN | 101615984 A | 12/2009 |
| JP | 2013524602 A | 6/2013 |

(Continued)

OTHER PUBLICATIONS

Catt: "Control signaling design for dual-codebook operation", 3GPP Draft; R1-103478, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20100628, Jun. 22, 2010, XP050448998, [retrieved on Jun. 22, 2010].

(Continued)

*Primary Examiner* — Robert Wilson
*Assistant Examiner* — Ronald H Davis
(74) *Attorney, Agent, or Firm* — Norton Rose Fulbright US LLP

(57) ABSTRACT

Techniques for reporting channel state information (CSI) in a multi-carrier wireless communication system are disclosed. In some examples, a user equipment determines a configuration for reporting CSI for each component carrier (CC) in a plurality of component carriers. For a first subframe, the user equipment determines a priority for transmitting CSI associated with the plurality of CCs based at least in part on the configuration. The user equipment sends, in the first subframe, a CSI report including the prioritized CSI. The CSI report can include CSI for a single CC, or CSI for multiple CCs. For multi-CC reporting of CSI, the user equipment can multiplex CSI reports or CSI elements for the plurality of CCs up to an available payload size.

49 Claims, 7 Drawing Sheets

(51) Int. Cl.
*H04L 5/14* (2006.01)
*H04W 72/04* (2009.01)

(56) References Cited

U.S. PATENT DOCUMENTS

| | | | | |
|---|---|---|---|---|
| 2011/0122794 A1* | 5/2011 | Kim et al. | ...................... | 370/252 |
| 2011/0141928 A1* | 6/2011 | Shin et al. | ...................... | 370/252 |
| 2011/0242982 A1* | 10/2011 | Lunttila et al. | ................. | 370/241 |
| 2012/0051451 A1* | 3/2012 | Kwon et al. | .................. | 375/285 |

FOREIGN PATENT DOCUMENTS

| | | |
|---|---|---|
| JP | 2013531399 A | 8/2013 |
| JP | 2013533675 A | 8/2013 |
| WO | WO-2009022566 A1 | 2/2009 |
| WO | WO-2011085230 A2 | 7/2011 |
| WO | WO-2011121063 A1 | 10/2011 |
| WO | WO-2011153706 A1 | 12/2011 |
| WO | WO-2011162008 A1 | 12/2011 |

OTHER PUBLICATIONS

International Search Report and Written Opinion—PCT/US2011/047583, ISA/EPO—Oct. 18, 2011.

LG Electronics: "Periodic COI transmission", 3GPP Draft; R1-104648 Periodic CQI Transmission, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; 20100823, Aug. 17, 2010, XP050449928, [retrieved on Aug. 17, 2010].

Oualcomm Incorporated: "CQI for CA", 3GPP Draft; R1-103537 CQI for CA, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20100628, Jun. 22, 2010 XP050449044, [retrieved on Jun. 22, 2010].

Panasonic: "Periodic CQI Reporting for Carrier Aggregation", 3GPP Draft; R1103749, 3rd Generation Partnership Project (3GPP), Mobile Competence Centre; 650, Route Des Lucioles; F-06921 Sophia-Antipolis Cedex; France, vol. RAN WG1, No. Dresden, Germany; 201006208, Jun. 22, 2010, XP050449179, [retrieved on Jun. 22, 2010].

Alcatel-Lucent: "UCI on PUSCH," 3GPP TSG-RAN WG1 #61bis, 3GPP, Jul. 2, 2010, R1-104083, pp. 2.

Editor (Motorola): 3GPP Draft; R1-080717-36213-81 O-CR, 3rd Generation Partnership Project (3GPP), Mobile Competence Centre; 650, Route Des Lucioles; F-06921 Sophia-Antipolis Cedex; France, vol. RAN WG1, No. Sorrento, Italy; Feb. 15, 2008, XP050109210, [retrieved on Feb. 15, 2008].

NTT Docomo et al., "Views on CQI Reporting Options in E-UTRA", 3GPP Draft; R1-081953 CQI Reporting, 3rd Generation Partnership Project (3GPP), Mobile Competence Centre; 650, Route Des Lucioles; F-06921 Sophia-Antipolis Cedex; France, vol. RAN WG1, No. Kansas City, USA; May 14, 2008, XP050110305, [retrieved on May 14, 2008].

Texas Instruments: "UCI Transmission on PUSCH for Carrier Aggregation", 3GPP Draft; R1-103694 TI UCI Transmission on PUSCH for Carrier Aggregation_V5, 3rd Generation Partnership Project (3GPP), Mobile Competence Centre ; 650, Route Des Lucioles ; F-06921 Sophia-Antipolis Cedex; France, vol. RAN WG1, No. Dresden, Germany; Jun. 22, 2010, XP050449131.

3GPP TSG-RAN WG1 Meeting 61bis, R1-103796, UCI Mapping on PUSCH with Carrier Aggregation, Nokia Siemens Networks, Nokia, Jun. 28-Jul. 2, 2010, 1 page.

* cited by examiner

CHANNEL STATE INFORMATION FEEDBACK FOR CARRIER AGGREGATION

RELATED APPLICATIONS

Claim of Priority Under 35 U.S.C. §119

The present application for patent claims priority to U.S. Provisional Application No. 61/374,130, entitled "Channel State Information Feedback for Carrier Aggregation," filed Aug. 16, 2010, assigned to the assignee hereof, and expressly incorporated herein by reference.

TECHNICAL FIELD

The present application relates to wireless communication systems in general and, more particularly, to wireless communication systems configured for carrier aggregation.

BACKGROUND

Wireless communication systems are widely deployed to provide various types of communication content such as voice, data, and so on. These systems may be multiple-access systems capable of supporting communication with multiple users by sharing system resources (e.g., bandwidth and transmit power).

In some wireless communication systems, a mobile terminal and a base station communicate on a downlink from the base station to the mobile terminal and an uplink from the mobile terminal to the base station. The mobile station may be configured to measure channel conditions on the downlink and to provide feedback about the channel conditions to the base station.

SUMMARY

Techniques for reporting channel state information (CSI) in a multi-carrier wireless communication system are disclosed. In some examples, a user equipment (UE) determines a configuration for reporting CSI for each component carrier (CC) in a plurality of component carriers. For a first subframe, the UE may determine a priority for transmitting CSI associated with the plurality of CCs based at least in part on the configuration. The UE sends, in the first subframe, a CSI report including the prioritized CSI. The CSI report can include CSI for a single CC, or CSI for multiple CCs. For multi-CC reporting of CSI, the UE can multiplex CSI reports or CSI elements for the plurality of CCs up to an available payload size.

In one aspect, a method of wireless communication is disclosed. The method includes determining a configuration for reporting channel state information (CSI) for each component carrier (CC) in a plurality of component carriers. The plurality of CCs may include a set of CCs configured for a multi-carrier user equipment (UE) and the CSI configuration can specify periodic reporting requirements for each of the configured CCs. The method includes determining a priority for transmitting CSI associated with one or more of the CCs in a first subframe. The priority can be based on an activation status of the CCs, and ordering of the CCs, a type of CSI to be reported, and other criteria. The method further includes transmitting a CSI report, based on the priority, in the first subframe.

In one aspect, the CSI configuration indicates an order of the CCs in the plurality of CCs. For example, one CC may be identified as a primary CC (PCC) and the other CCs may be identified as secondary CC (SCCs). For CSI reporting, the set of CCs may be limited to only activated CCs among the plurality of configured CCs configured for the UE. Determining the priority may include prioritizing CSI for the PCC above CSI for the SCCs. Among SCCs, a further prioritization based on an index associated with each CC, a transmission mode of the CC, and/or a type of CSI to be reported for the CC may be performed. This may include prioritizing CCs that are multiple-input multiple-output (MIMO) carriers above CCs that are single-input multiple-output (SIMO) carriers, prioritizing rank indicator CSI above channel quality indicator CSI, etc.

Alternatively or additionally, determining a priority of CSI may include prioritizing among CSI types. In one aspect, the UE may determine that CSI comprising a rank indicator (RI) for a first CC in the plurality of CCs is due for transmission in the first subframe. The UE may also determine that CSI comprising a channel quality indicator (CQI) and/or a precoding matrix indicator (PMI) for a second CC is due for transmission in the first subframe. Based on the priority, the UE may drop the CQI/PMI in the first subframe and transmit a CSI report with the RI. In one example, the UE multiplexes the CSI for the first CC and the second CC and transmits the multiplexed CSI in the CSI report. Multiplexing CSI into an available payload may be performed according to an ordering of the CCs, a type of the CSI, a size of the uplink payload, and other considerations.

In another aspect, an apparatus for wireless communication in a multi-carrier wireless communication system is disclosed. The apparatus can include at least one processor and a memory coupled to the at least one processor. The memory can store instructions which, when executed by the processor, configure the processor to determine a configuration for reporting channel state information (CSI) for each component carrier (CC) in a plurality of CCs. The apparatus can determine a priority for transmitting CSI associated with one or more of the CCs in the plurality of CCs in a first subframe. The priority can be based at least in part on the configuration and further based on an activation status of the configured CCs. The apparatus can transmit a CSI report in the first subframe based on the priority.

In another aspect, an apparatus for wireless communication in a multi-carrier communication system is disclosed. The apparatus can include means for determining a configuration for reporting channel state information (CSI) for each component carrier (CC) in a plurality of CCs. The apparatus may also include means for determining a priority, for a first subframe, for transmitting CSI associated with one or more of the CCs in the plurality of CCs. The means may determine priority may be based at least in part on the configuration for reporting CSI as well as upon an activation status of the CCs. The apparatus may include means for transmitting a CSI report in the first subframe based on the priority.

In another aspect, a method of wireless communication is disclosed. The method includes determining a configuration for reporting channel state information (CSI) for each CC in a plurality of component carriers. The plurality of CCs may include a set of CCs configured for a multi-carrier user equipment and the CSI configuration can specify periodic reporting requirements for each of the configured CCs, including a priority for reporting CSI associated with one or more of the CCs in a first subframe. The method includes transmitting the CSI reporting configuration to the user equipment in one or more radio resource control (RRC) messages and receiving, from the user equipment, a CSI report including CSI for one or more of the plurality of CCs prioritized in accordance with the CSI reporting configuration.

In another aspect, an apparatus for wireless communication in a multi-carrier wireless communication system is disclosed. The apparatus can include at least one processor and a memory coupled to the at least one processor. The memory can store instructions which, when executed by the processor, configure the processor to determine a channel state information (CSI) reporting configuration comprising information for prioritizing CSI among a plurality of CCs configured for a user equipment, to transmit the CSI reporting configuration to the user equipment in one or more radio resource control (RRC) messages, and to receive, from the user equipment, a CSI report comprising CSI for one or more of the plurality of CCs prioritized in accordance with the CSI reporting configuration.

In yet another aspect, an apparatus for wireless communication in a multi-carrier communication system is disclosed. The apparatus can include means for means for determining a reporting configuration for channel state information (CSI) including information for prioritizing CSI among a plurality of CCs configured for a user equipment. The apparatus may also include means for means for transmitting the configuration for CSI reporting to the user equipment in one or more radio resource control (RRC) messages, and means for receiving, from the user equipment, a CSI report including CSI for one or more of the plurality of CCs prioritized in accordance with the CSI reporting configuration.

These and other features, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Aspects of the present disclosure are illustrated in the accompanying drawings in which.

DETAILED DESCRIPTION

Figure 1:
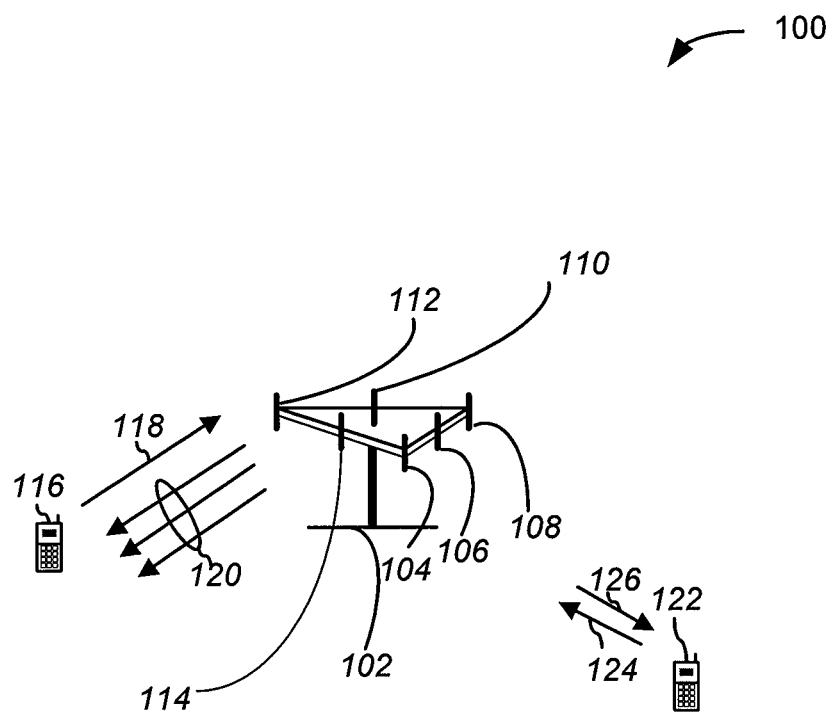
FIG. 1 illustrates an exemplary multi-carrier wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various features and aspects of the present disclosure will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The techniques described herein may be practiced in a multi-carrier wireless communication system. One exemplary wireless communication system may utilize an orthogonal frequency division multiplex (OFDM) that partitions the overall system bandwidth into multiple ($N_F$) subcarriers, which may also be referred to as frequency sub-channels, tones or frequency bins. Data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on forward and reverse links. The forward link (or downlink, DL) can refer to a communication link from the base stations to the wireless terminals. The reverse link (or uplink, UL) can refer to the communication link from the terminals to the base stations. In a multi-carrier system, one or more component carriers (CCs) can be configured on the DL and the UL for each wireless terminal. Such configurations can be symmetric (in which a wireless terminal has a same number of downlink and uplink component carriers), or asymmetric (in which the wireless has a different number of downlink and uplink carriers). The transmission mode of each CCs, in turn, can be configured separately.

MIMO transmissions employ multiple ($N_T$) transmit antennas and multiple ($N_R$) receive antennas. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO transmission can provide improved performance (e.g., higher throughput and/or greater reliability) if the additional dimensionalities created by the multiple transmit and receive antennas are utilized. MIMO is also supported in both time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 shows a multi-carrier wireless communication system 100. A base station 102 may include multiple antenna groups, and each antenna group may comprise one or more antennas. For example, if the base station 102 comprises six antennas, one antenna group may comprise a first antenna 104 and a second antenna 106, another antenna group may comprise a third antenna 108 and a fourth antenna 110, while a third antenna group may comprise a fifth antenna 112 and a sixth antenna 114. It should be noted that while each of the above-noted antenna groups were identified as having two antennas, more or fewer antennas may be utilized in each antenna group.

A first user equipment 116 communicates with, for example, the fifth antenna 112 and the sixth antenna 114 to enable the transmission of information to the first user equipment 116 over a first forward link 120. As shown, the exemplary first forward link 120 comprises three component carriers (CCs) while the exemplary first reverse link 118 includes only one component carrier. The number of component carriers in both the forward link 120 and the reverse link 118 may vary over time and is not limited by the present example. For instance, from time to time, base station 102 may configure and reconfigure a plurality of uplink and downlink CCs for the multi-carrier user equipment 116, 122 it serves.

FIG. 1 also illustrates a second user equipment 122 in communication with, for example, the third antenna 108 and the fourth antenna 110 of base station 102 to enable the transmission of information to the second user equipment 122 over a second forward link 126, and the reception of information from the second user equipment 122 over a second reverse link 124. In a Frequency Division Duplex (FDD) system, the component carriers 118, 120, 124 126 shown in FIG. 1 may use different frequencies for communication. For example, the first forward link 120 may use a different frequency than that used by the first reverse link 118.

Each group of antennas and/or the area in which they are designed to communicate may be referred to as a sector of base station 102. For example, the antenna groups depicted in FIG. 1 may be designed to communicate with the user equipment 116, 122 in a different sectors of the base station 102. On the forward links 120 and 126, the transmitting antennas of the base station 102 may utilize beamforming in order to improve the signal-to-noise ratio of the forward links for the different user equipment 116 and 122. Use of beamforming to transmit to user equipment scattered throughout a coverage area may reduce the amount of interference to user equipment in the neighboring cells.

The exemplary multi-carrier communication system 100 may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

In addition, the various logical transport channels in the communication system may be classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

The downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PC-FICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
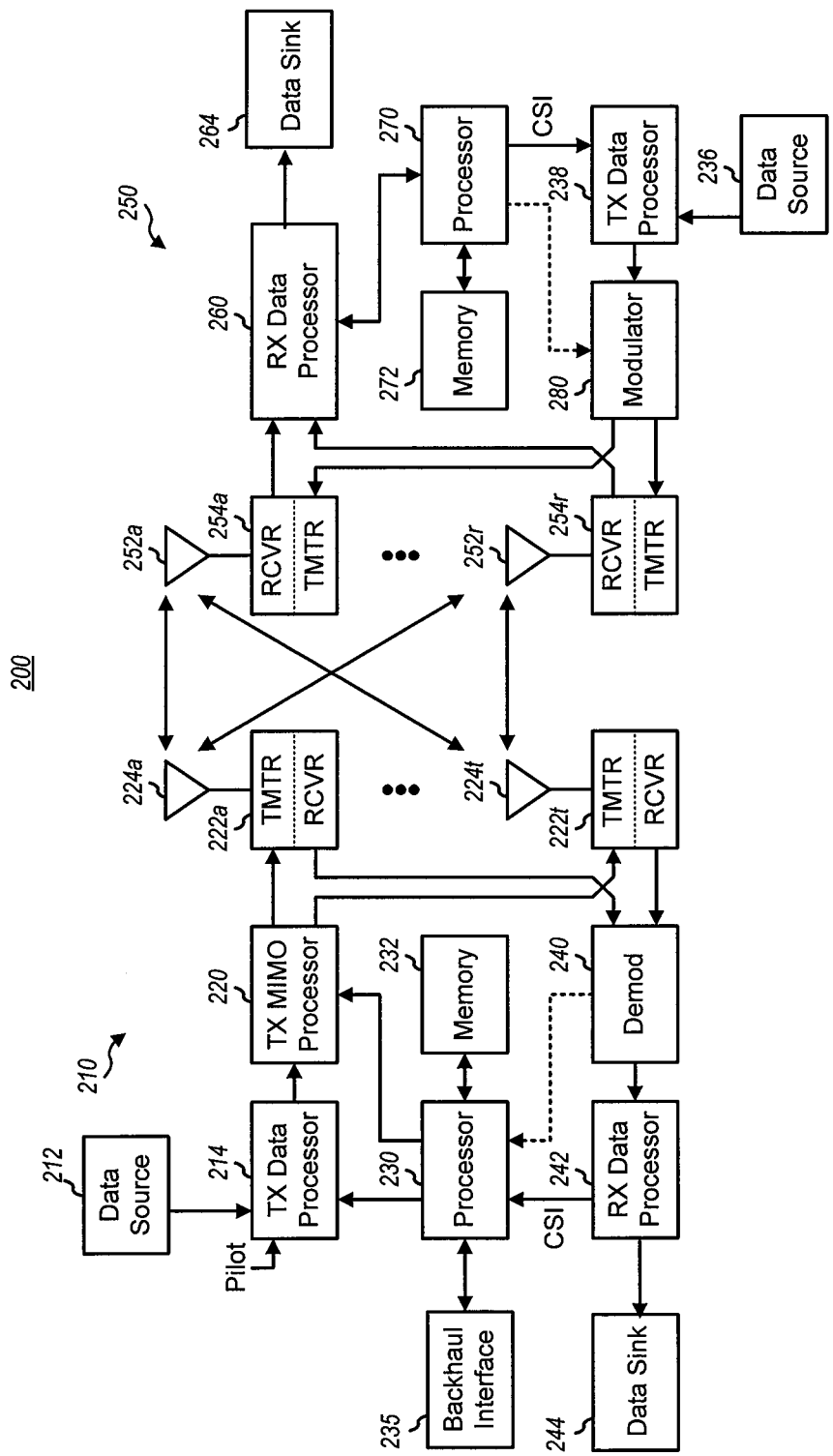
FIG. 2 is a block diagram of a base station and user equipment in an exemplary multi-carrier wireless communication system such as illustrated in FIG. 1.

Further, the following terminology and features may be used in describing the various disclosed embodiments:
3GPP 3rd Generation Partnership Project
AMC Adaptive modulation and coding
BTS Base transceiver station
CC Component carrier
CSI Channel state information
CQI Channel quality indicator
DCI Downlink control information
DFT-S-OFDM Discrete Fourier transform spread OFDM
DL Downlink (base station to subscriber transmission)
E-UTRAN Evolved UMTS terrestrial radio access network
eNB Evolved Node B
FDD Frequency division duplex
LTE Long term evolution
MIMO Multiple-input-multiple-output
OFDMA Orthogonal frequency division multiple access
PDCCH Physical downlink control channel
PDSCH Physical downlink shared channel
PMI Precoding matrix indicator
PCC Primary component carrier
PUCCH Physical uplink control channel
PUSCH Physical uplink shared channel
RI Rank Indicator
SCC Secondary component carrier
SIMO Single-input-multiple-output
UL Uplink FIG. 2 is a block diagram illustrating additional aspects of an exemplary multi-carrier wireless communication system 200 which can be as described in connection with FIG. 1. As shown, system 200 comprises a base station 210 (also referred to as a "transmitter system," "access point," or "eNodeB") and a user equipment 250 (also referred to as a "receiver system," or "access terminal"). It will be appreciated that even though the base station 210 is referred to as a transmitter system and the user equipment 250 is referred to as a receiver system, as illustrated, these systems communicate bi-directionally. As such, the terms "transmitter system" and "receiver system" are not limited to single direction communications from either system. Further, it should also be noted the transmitter system 210 and the receiver system 250 of FIG. 2 may each communicate with a plurality of other receiver and transmitter systems.

At the base station 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data. The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the present example, modulation symbols for all data streams may be provided to a TX MIMO processor 220, which can perform further processing (e.g., for OFDM). The TX MIMO processor 220 may then provide $N_T$ modulation symbol streams to $N_T$ transmitter system transceivers (TMTR) 222a through 222t. The TX MIMO processor 220 may further apply beamforming weights to the symbols of the data streams and to the antenna 224 from which the symbol is transmitted.

Transceivers 222a through 222t at base station 210 receive and process a respective symbol stream to provide one or more analog signals, and further condition the analog signals to provide a modulated signal suitable for transmission. In some systems, the conditioning may include, but is not limited to, operations such as amplification, filtering, up-conversion and the like. The modulated signals produced by the transceivers 222a through 222t are then transmitted from the antennas 224a through 224t of transmitter system 210 as shown in FIG. 2.

At the user equipment 250, the transmitted modulated signals may be received by the antennas 252a through 252r, and the received signal from each of the receiver system antennas 252a through 252r is provided to a respective transceiver (RCVR) 254a through 254r. Each transceiver 254a through 254r at the user equipment 250 may condition a respective received signal, digitize the conditioned signal to provide samples and further processes the samples to provide a corresponding "received" symbol stream. Conditioning may include, but is not limited to, operations such as amplification, filtering, down-conversion and the like.

An RX data processor 260 receives and processes symbol streams from transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 can demodulate, de-interleave and decode each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

A channel response estimate may be generated by the RX data processor 260 and used to perform space/time processing at the receiver system, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system can derive channel state information (CSI) which may include information about the communication link and/or the received data stream.

The CSI may include, for example, different types of information about channel conditions. For example, CSI can include a rank indicator (RI), a channel quality indicator (CQI), and/or a precoding matrix index (PMI) for each CC configured by base station 210. Processor 270 can generate CSI reports that include PMI, CQI, and/or RI for one or more of the carriers configured for use by user equipment 250. The CSI reports may be selected from a set of predetermined reporting types each of which may include different types of CSI and/or payload sizes.

Periodically, or when triggered by transmitter system 210, user equipment 250 may transmit CSI reports with CSI for one or more of the component carriers. Periodic CSI reporting may be semi-statically configured for each component carrier by the base station 210 via radio resource control (RRC) signaling. The configuration may specify the timing at which CSI reports are made and the type of CSI reporting for a particular component carrier. For example, the configuration may indicate a periodicity for each configured CC. As a result, CSI reports for different CCs and/or different types of CSI for an individual CC may become due for transmission in the same subframe (i.e., the transmissions may collide).

For example, if a CSI report for component carrier #1 is configured for a reporting period of 3 subframes, and a CSI report for component carrier #2 is configured for a reporting period of 4 transmission subframes, then the two CSI reports may collide every 12 subframes (i.e., the lowest common multiple of 3 and 4). In some cases, the payload size available for reporting CSI may be insufficient to accommodate all of the CSI due for transmission in a particular subframe and the user equipment 250 may prioritize CSI across and within the set of component carriers.

CSI reports received by the transmitter system 210 can be used to make proper decisions regarding, for example, scheduling, MIMO settings, modulation and coding choices and may be transmitted by user equipment 250 using different control formats. For example, CSI reports may be sent to the base station 210 in a physical uplink control channel (PUCCH) on one or more uplink component carriers using a format, such as PUCCH Format 2/2A/2B as defined for LTE Release 8, or a DFT-S-OFDM format such as PUCCH Format 3 proposed for LTE Release 10.

Receiver system 250 may be capable of receiving and processing spatially multiplexed signals. Spatial multiplexing may be performed at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system that receives and processes spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. For example, both the transmitter system 210 and the receiver system 250 may contain a codebook with a number of precoding matrices. Each of these precoding matrices can, in some instances, be related to an amount of cross-correlation experienced in the received signal. Since it is advantageous to send the index of a particular matrix rather than the values in the matrix, the receiver system 250 may send a CSI report with PMI information to the transmitter system 210. A rank indicator (RI) which indicates to the transmitter system 210 how many independent data streams to use in spatial multiplexing may also transmitted.

System 200 can also utilize transmit diversity schemes instead of the spatially multiplexed scheme described above. In these examples, the same data stream is transmitted across the transmitter system antennas 224a through 224t. The data rate delivered to the receiver system 250 is typically lower than spatially multiplexed MIMO communication systems 200. Transmit diversity schemes can provide robustness and reliability of the communication channel. Each of the signals transmitted from the transmitter system antennas 224a through 224t will experience a different interference environment (e.g., fading, reflection, multi-path phase shifts). The different signal characteristics received at the receiver system antennas 252a through 254r may be useful in determining the appropriate data stream.

Other examples may utilize a combination of spatial multiplexing and transmit diversity. For example, in a system with four antennas 224, a first data stream may be transmitted on two of the antennas, and a second data stream may be transmitted on the remaining two antennas. In these exemplary systems, the rank indicator for the channel may be set to an integer lower than the full rank of the precode matrix, indicating to the transmitter system 210 to employ a combination of spatial multiplexing and transmit diversity.

At the transmitter system 210, the modulated signals from the receiver system 250 are received by antennas 224, conditioned by the transceivers 222, demodulated by a demodulator 240, and processed by the RX data processor 242 to extract the reserve link message transmitted by the receiver system 250. Processor 230 at the transmitter system 210 may then determine which pre-coding matrix to use for future forward link transmissions. Processor 230 can also use the received signal to adjust the beamforming weights for future forward link transmissions.

As indicated previously, CSI reports from user equipment 250 can be used to determine, for example, data rates as well as the coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. Traffic data and/or other information processed by the RX data processor 242 of the transmitter system 210 can be provided to a data sink 244.

It will be recognized that processor 230 at the base station 210 and the processor 270 at the user equipment 250 direct the operations performed at their respective devices. In particular, the processors 230, 270 are capable of executing instructions to carry out a sequence of steps for performing different algorithms related to CSI reporting as described herein. Additionally, a memory 232 at the transmitter system 210 and a memory 272 at the receiver system 250 can provide storage for the instructions and data used by the transmitter system processor 230 and the receiver system processor 270, respectively.

According to the present disclosure, a multi-carrier UE may determine a priority for sending CSI associated with one or more component carriers in a particular subframe. The priority may be based on an ordering of configured CCs. For example, the priority may be based at least in part on a corresponding RRC configured index such as the value of a cross-carrier indication field (CIF) for a particular component carrier. The CSI may also be prioritized based on the type of CSI to be reported. For instance, a UE may be configured to send different types of CSI reports for different ones of its configured CCs. The different reporting types, in turn, may include CSI information with different priorities across CCs.

In the case of a UE configured with two component carriers, one component carrier may be designated as the primary component carrier (PCC) and the other component carrier may be designated as the secondary component carrier (SCC). CSI reporting for the PCC may be given a higher priority than CSI reporting for the SCC such that, when the CSI reports configured for the PCC and the SCC collide in an uplink subframe, the UE may prioritize the CSI report for the PCC and drop the CSI report for the SCC in that particular subframe.

For the case of a UE configured for more than two downlink component carriers, one component carrier may be designated as the primary component carrier (PCC) and the other component carriers may be designated as the secondary component carriers (SCCs). The SCCs may be further ordered according to a corresponding RRC configured index, such as the value of their carrier indicator field (CIF), and/or ordered by transmission mode. When ordered by transmission mode, MIMO carriers may be given a higher priority that SIMO carriers. In one example, SCCs are ordered according to their carrier frequency. When a collision occurs, CSI is reported according to a priority and CSI for lower priority CCs or CSI types may be dropped in a particular subframe.

In some examples, a multi-carrier UE is configured to use a PUCCH format compatible with a DFT-S-OFDM waveform. For example, the UE may be configured to use a DFT-S-OFDM waveform and a PUCCH format such as LTE Release 10 Format 3. In this case, the PUCCH payload may accommodate more than one CSI report in a subframe. If only one CSI report is due for transmission in a particular subframe, then the UE may fall back to PUCCH Format 2/2A/2B; otherwise it may fill the available payload by multiplexing CSI and/or CSI reports according to the priority. The UE may also order CSI by type and/or by component carrier when generating the multiplexed payload.

In addition, a multi-carrier UE may prioritize CSI reporting in relation to an activation status of its configured CCs. At any given time, a configured CC may be either activated or deactivated as determined, for example, by a serving base station. Depending upon its configuration, the UE may suspend CSI reporting while a CC is deactivated, irrespective of prioritization. Alternatively, a predetermined pattern or bit sequence may be transmitted in place of CSI for a deactivated CC.

When the UE is configured with a plurality (two or more) of component carriers and a PUCCH format having a maximum payload size that can accommodate more than one CSI report at a time, it may multiplex CSI elements and/or CSI reports for different ones of its configured CCs in a same subframe up to an available payload size. If all of the CSI reports due for transmission in a particular subframe can be multiplexed into the PUCCH payload, then the UE may use a prioritization to order the CSI elements and/or CSI reports within the PUCCH payload. If all of the CSI reports due for transmission in a particular time slot cannot be multiplexed (fitted) into the PUCCH payload, then the UE may select a subset of CSI reports according to a first priority, and order the selected CSI reports within the PUCCH payload according to a second priority.

The selection of the CSI reports and the ordering within the PUCCH payload may be based on a CSI report type, a carrier index of the component carriers, a sub-band frequency associated with a CC, or any combination thereof. In one aspect, prioritization may involve selecting and ordering only one type of CSI (e.g., RI, CQI, or PMI) in a given subframe, or prioritization may involve combinations of different type of CSI elements (e.g., RI & CQI, RI & PMI, CQI & PMI). As one example, within a group of CCs, RI reports may be prioritized over any of a CQI report, a PMI report and a sub-band CQI report. Also, the CSI for a PCC may be prioritized over CSI for secondary component carriers.

The UE may be configured with MIMO (multiple-input, multiple-output) component carriers and/or SIMO (single-input, multiple output) component carriers. CSI reporting for the MIMO component carriers may be prioritized over CSI reporting associated with the SIMO component carriers. The CSI reports associated with the MIMO component carriers may be prioritized in order of CSI reporting type (e.g., RI, CQI, PMI, and sub-band PMI) and/or ordered according to carrier indices of the MIMO component carriers, sub-band frequencies of the MIMO component carriers, or a combination thereof.

When multiplexing CSI reports, the UE may be configured to maximize the number of CSI reports for the PUCCH payload when the size of the CSI reports due for transmission exceeds the maximum PUCCH payload size. For example, prioritization may include first selecting the CSI report components with the smallest bit width, then selecting the CSI report components with the next smallest bit width, etc., until the maximum PUCCH payload size is reached.

The UE may receive RRC signaling that designates one or more of its configured CCs as activated, and one or more its configured CCs as deactivated. The UE may be configured to multiplex CSI based on priority, for only the activated component carriers, until the maximum payload size is reached or all the CSI for the activated component carriers has been multiplexed. Alternatively, the UE may be configured to multiplex CSI reports for the one or more activated component carriers and CSI reports for the one or more deactivated component carriers that have been zero-padded or filled with some other predetermined pattern, until the maximum payload size is reached or until all the CSI reports for the activated component carriers and the deactivated component carriers in a subframe have been multiplexed.

Where the payload size required for multiplexing the CSI is less than the maximum payload size, the UE may include a CSI report and a carrier index for the component carrier having the best channel quality in each CSI reporting instance. In one aspect, where the component carrier with the best channel quality is a MIMO component carrier, the UE may report one or more of the RI of the component carrier, the CQI of the component carrier, and the PMI of the component carrier according to the determined priority.

Figure 3:
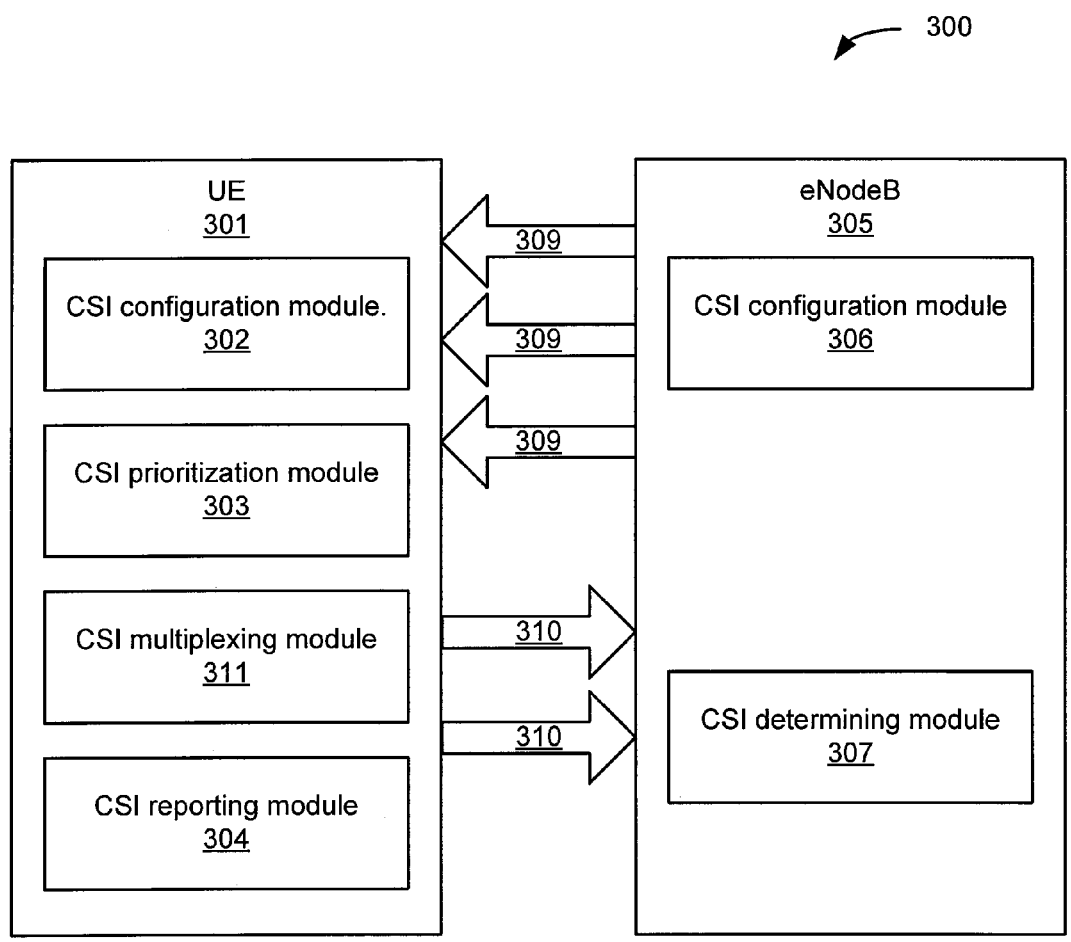
FIG. 3 is a block diagram showing further aspects of a base station and user equipment according to the present disclosure.

FIG. 3 is a functional block diagram illustrating additional aspects of an exemplary multi-carrier wireless communication system 300. System 300 includes a multi-carrier UE 301 that can receive and transmit information, signals, data, instructions, commands, bits, symbols and the like on a plurality of downlink component carriers 309 and a plurality of uplink component carriers 310, respectively. System 300 also includes an eNodeB 305 that supports carrier aggregation and which can receive and transmit information, signals, data, instructions, commands, bits, symbols and the like on the plurality of downlink component carriers 309 and the plurality of uplink component carriers 310, respectively.

UE 301 may include one or more components of the receiver system 250 illustrated in FIG. 2, which may be organized or otherwise configured as modules of UE 301. The UE 301 may include a CSI configuration module 302 for determining a CSI reporting configuration which as described herein, may be received on downlink component carriers 309. The UE 301 may also include a CSI prioritization module 303 for prioritizing CSI elements and CSI reports due for transmission in a same subframe. The UE 301 may also include a CSI multiplexing module 311 for ordering and fitting CSI and/or CSI reports in a payload available for reporting CSI in the subframe. Additionally, UE 301 includes a CSI reporting module 304 for transmitting CSI and/or CSI reports, as determined by the CSI prioritizing module 303, on uplink component carriers 310.

The eNodeB 305 may include one or more components of the transmitter system 210 illustrated in FIG. 2, which may be organized or otherwise configured as modules of eNodeB 305. As shown, eNodeB 305 includes a CSI configuration module 306 for sending a CSI reporting configuration for one or more downlink component carriers 309 to the UE 301. The CSI reporting configuration may be sent to UE 301 in one or more RRC messages and may include, for each configured CC, a reporting interval and a carrier index. The eNodeB 305 can also include a CSI determining module 307 for receiving CSI reports, as described herein, from the UE 301 on one or more of uplink component carriers 310.

Figure 4:
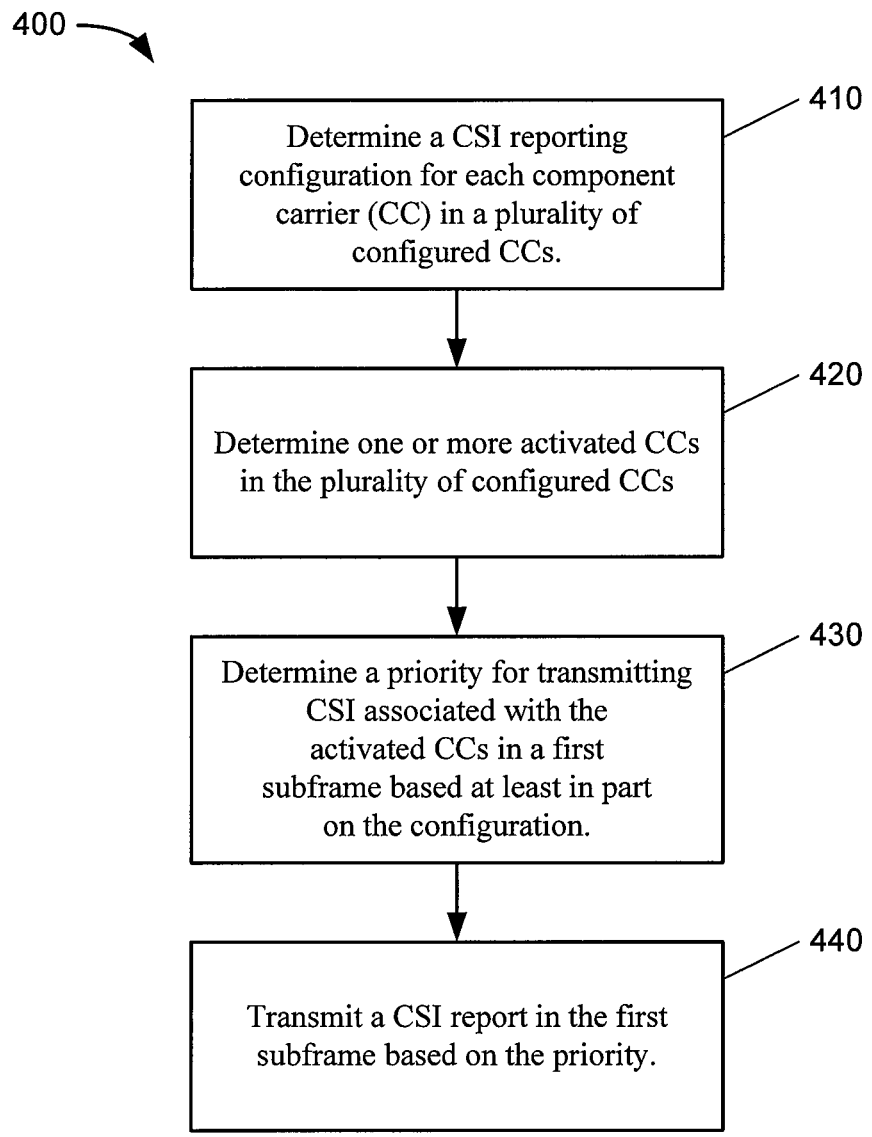
FIG. 4 is a flowchart illustrating an exemplary method of reporting CSI in a multi-carrier wireless communication system.

FIG. 4 is a flowchart 400 illustrating an exemplary method according to the present disclosure that may be implemented by a UE, such as UE 301. At operation 410, a component of the UE, such as CSI configuration module 302, determines a configuration for reporting channel state information (CSI) for each component carrier in a plurality of configured component carriers, such as the plurality of downlink component carriers 309.

At operation 420, a module of the UE, such as CSI prioritization module 303, identifies a set of activated CCs for CSI reporting within the set of configured CCs. At operation 430, the UE determines a priority, for a first subframe, for transmitting CSI associated with one or more of the CCs in the set of activated CCs. The CSI prioritization module 303 can prioritize CSI based at least in part on the CSI configuration. As previously discussed, prioritization can be performed across the set of activated CCs and may include prioritizing CSI for a PCC above the CSI for SCCs, prioritizing among SCCs by carrier index or transmission mode, and/or prioritizing by CSI type. At operation 440, a module in the UE, such as CSI reporting module 304, transmits a CSI report in the first subframe, in one or more of a plurality of component carriers. The CSI report may include prioritized CSI elements and/or CSI reports for one or more CCs. The CSI reporting module sends the CSI report on an uplink component carriers 310.

Figure 5:
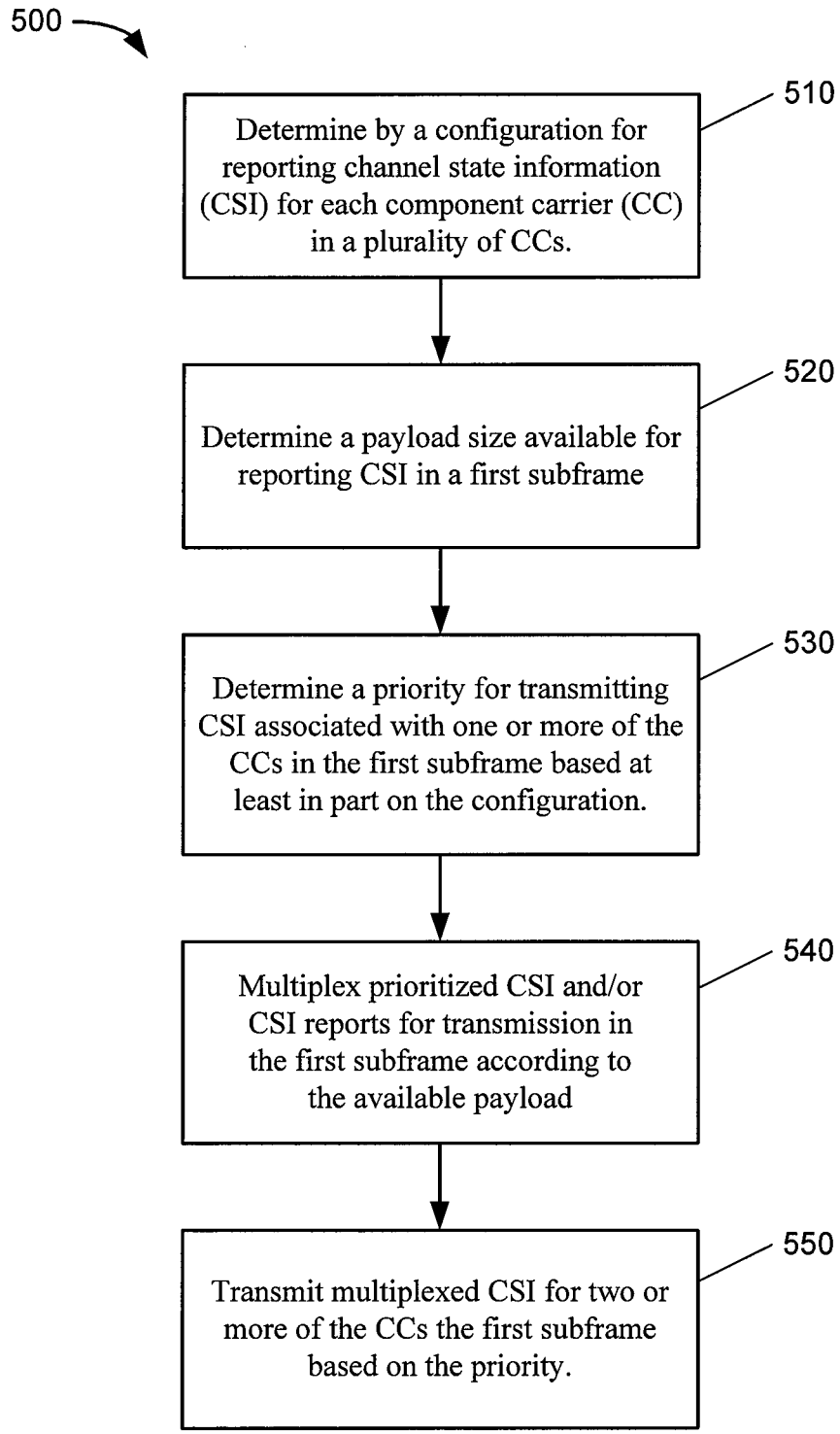
FIG. 5 is a flowchart illustrating an exemplary method of reporting CSI in a multi-carrier wireless communication system.

FIG. 5 is a flowchart 500 illustrating another exemplary method according to the present disclosure that may be implemented by a UE, such as UE 301. At operation 510, a module of the UE, such as CSI configuration module 302, determines a configuration for reporting CSI for each component carrier in a plurality of component carriers configured for use by the UE, such as the plurality of downlink component carriers 309.

At operation 520, the UE determines a payload size available for reporting CSI in a first subframe. The payload size may be determined by a module, such as CSI reporting module 304, and may depend upon a configured transmission format. In one particular example, the UE may be configured to use a DFT-S-OFDM waveform and the transmission format may be an LTE/A format such PUCCH Format 3. At operation 530, the UE determines a priority for transmitting CSI associated with one or more of the CCs. Prioritization may be performed by CSI prioritization module 303 as previously described and may be applied to CSI elements and/or CSI reports across a plurality of component carriers. In one example, the UE first determines a subset of activated CC and then prioritizes CSI in relation to only the activated CCs.

At operation 540, CSI is multiplexed for reporting in the first subframe. Multiplexing may be performed by a module of the UE, such as the CSI multiplexing module 311. The CSI to be multiplexed may include individual CSI elements (e.g., RI for CC1, PMI for CC2, etc.) or individual CSI reports for different CCs (e.g., reporting type 3 for CC1, reporting type 1 for CC3, etc.), or a combination of these. In addition, CSI multiplexing module 311 may order the CSI within the available payload based on CC index, CSI type, etc. For example, if CSI for a first CC (CC1) and a third CC (CC3) is due for reporting, the UE may add CSI to the payload by CC (e.g., RI for CC1, PMI for CC1, CQI for CC1, RI for CC3, . . . ) or by type (RI for CC1, RI for CC3, PMI for CC1, PMI for CC3, . . . ). Different CSI reports may be similarly ordered within the available payload. In one example, a carrier index and CSI for a CC having the best CQI is also multiplexed for transmission with the prioritized CSI.

When the available payload is insufficient for all CSI that is due for reporting in the first subframe, the UE may drop lower priority CSI and/or CSI reports in order to fit the higher priority CSI to the available payload. At operation 530, a module in the UE, such as CSI reporting module 304, transmits the multiplexed CSI in the first subframe, in one or more of a plurality of component carriers, such as the plurality of uplink component carriers 310, based on the priority. The multiplexed CSI may be regarded as a single CSI report comprising CSI elements for multiple CCs, or as multiple CSI reports multiplexed for transmission in the first subframe without departing from the scope of the present disclosure.

Figure 6:
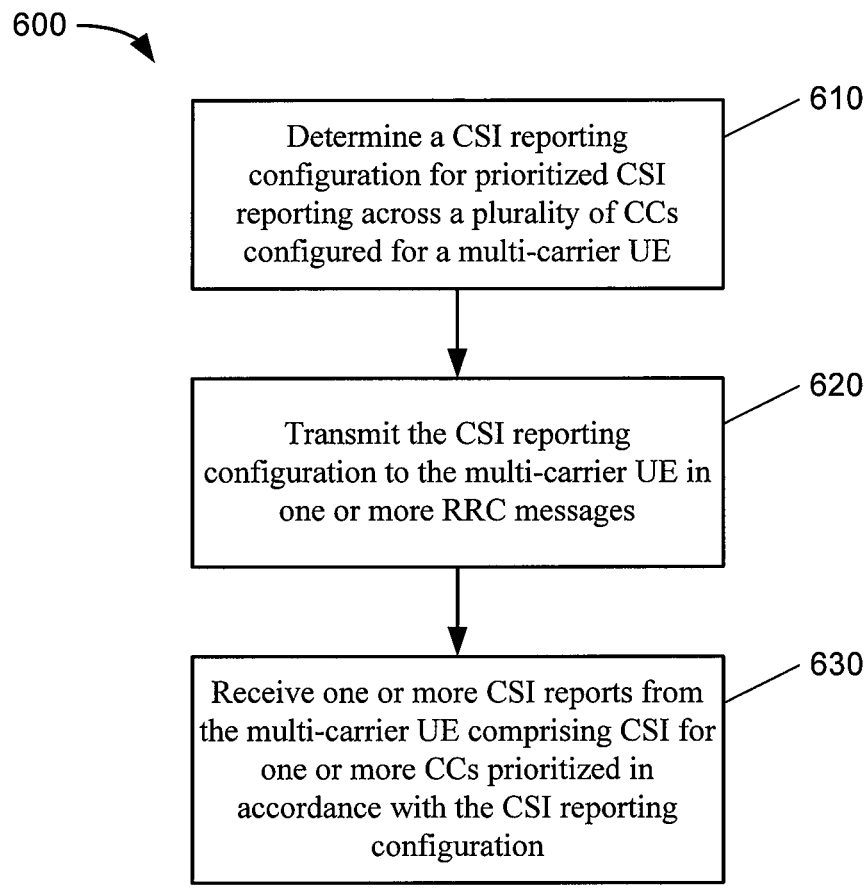
FIG. 6 is a flowchart illustrating an exemplary method of CSI reporting in a multi-carrier wireless communication system.

FIG. 6 is a flowchart 600 illustrating an exemplary method according to the present disclosure that may be implemented by an eNodeB, such as eNodeB 305. At operation 610, a component of the eNodeB, such as CSI configuration module 306, determines a CSI reporting configuration for prioritizing CSI reporting across a plurality of component carriers, such as the plurality of downlink component carriers 309, configured for a multi-carrier UE, such as UE 301.

At operation 620, a component of the eNodeB, such as CSI configuration module 306, transmits the CSI reporting configuration to the multi-carrier UE in one or more radio resource control (RRC) messages on one or more of the plurality of downlink component carriers 309. At operation 630, a component of the eNodeB, such as CSI determining module 307, receives one or more CSI reports from the multi-carrier UE in one or more of a plurality of uplink component carriers, such as the plurality of uplink component carriers 310, where the one or more CSI reports include CSI for one or more of a plurality of downlink component carriers, such as the plurality of downlink component carriers 309, and where the CSI is prioritized in accordance with the CSI reporting configuration.

Figure 7:
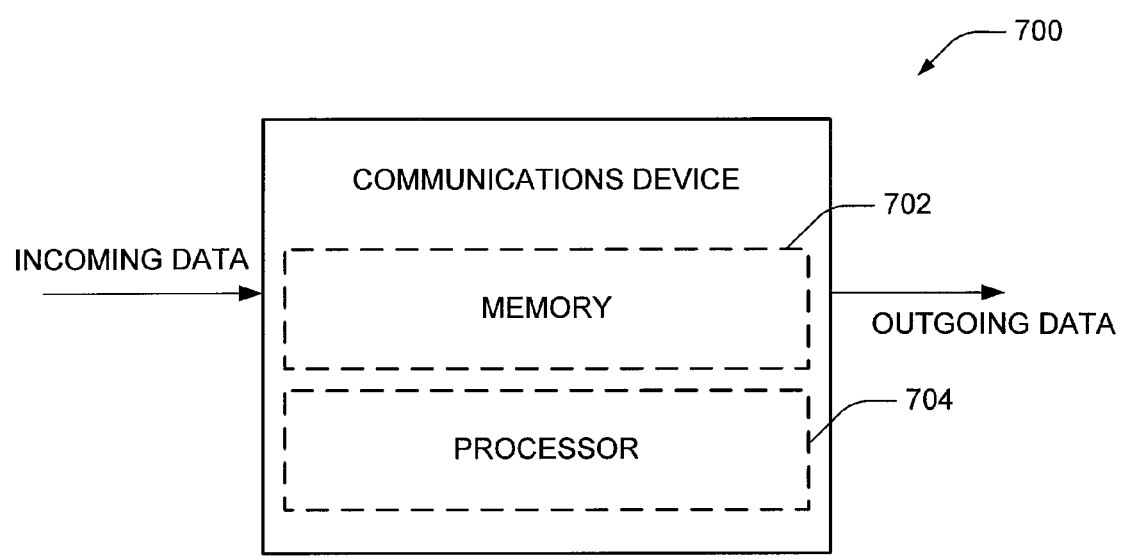
FIG. 7 illustrates an exemplary apparatus capable of performing the exemplary methods illustrated in FIGS. 4-6.

FIG. 7 illustrates an apparatus 700 within which the various disclosed embodiments may be implemented. In particular, the apparatus 700 may comprise at least a portion of an eNodeB such as eNodeB 305 illustrated in FIG. 3 and/or at least a portion of a user equipment such as UE 301 illustrated in FIG. 3 and/or at least a portion of a transmitter system or a receiver system such as the transmitter system 210 and the receiver system 250 that are depicted in FIG. 2. The apparatus 700 can be resident within a wireless network and receive incoming data via, for example, one or more receivers and/or the appropriate reception and decoding circuitry (e.g., antennas, transceivers, demodulators and the like). The apparatus 700 can also transmit outgoing data via, for example, one or more transmitters and/or the appropriate encoding and transmission circuitry (e.g., antennas, transceivers, modulators and the like). Additionally, or alternatively, the apparatus 700 may be resident within a wired network.

FIG. 7 further illustrates that the apparatus 700 can include a memory 702 that can retain instructions for performing one or more operations, such as signal conditioning, analysis and the like. Additionally, the apparatus 700 of FIG. 7 may include a processor 704 that can execute instructions that are stored in the memory 702 and/or instructions that are received from another device. The instructions can relate to, for example, configuring or operating the apparatus 700 or a related communications apparatus. It should be noted that while the memory 702 that is depicted in FIG. 7 is shown as a single block, it may comprise two or more separate memories that constitute separate physical and/or logical units. In addition, the memory while being communicatively connected to the processor 704, may reside fully or partially outside of the apparatus 700. It is also to be understood that one or more components, such as the eNodeB 305 and the UE 301 depicted in FIG. 3 can exist within a memory such as memory 702.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 700 of FIG. 7 can be employed as a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method of wireless communication, comprising:
   determining, by a user equipment, a configuration for reporting channel state information (CSI) for each component carrier (CC) in a plurality of CCs based on a radio resource control (RRC) message;
   determining a priority, for a first subframe, for transmitting CSI associated with each of one or more of the CCs in the plurality of CCs based on at least one of: the configuration, a CSI report type, or a carrier index;
   determining a payload size available in a physical uplink control channel (PUCCH) for reporting CSI in the first subframe, wherein the payload size available in the PUCCH depends upon a transmission format used for the first subframe;
   determining whether CSI for one or more CCs of the plurality of CCs collide with each other in the first subframe; and
   transmitting, by the user equipment, a CSI report in the first subframe based on the priority, wherein the CSI for the one or more CCs of the plurality of CCs is transmitted in the CSI report up to the determined payload size available in the PUCCH in response to determining the collision of the CSI for the one or more CCs of the plurality of CCs in the first subframe, wherein the one or more CCs are selected according to the priority, wherein the CSI for the one or more CCs of the plurality of CCs that does not fit within the determined payload size available in the PUCCH is dropped.

2. The method of claim 1, wherein the configuration indicates an ordering of CCs in the plurality of CCs and a reporting type for each CC.

3. The method of claim 1, wherein determining the configuration comprises receiving the RRC message.

4. The method of claim 1, wherein determining the priority comprises:
   determining that CSI for a primary component carrier (PCC) in the plurality of CCs is due for transmission in the first subframe;
   determining that CSI for a secondary component carrier (SCC) in the plurality of CCs is due for transmission in the first subframe; and
   dropping the CSI for the SCC in the first subframe.

5. The method of claim 4, wherein transmitting the CSI report comprises transmitting the CSI for the PCC.

6. The method of claim 1, wherein determining the priority comprises:
   determining that CSI comprising a rank indicator (RI) is due in the first subframe for a first CC in the plurality of CCs;
   determining that CSI comprising one of a channel quality indicator (CQI) and a pre-coding matrix indicator (PMI) is due in the first subframe for a second CC in the plurality of CCs; and
   dropping the one of the CQI and the PMI for the second CC in the first subframe.

7. The method of claim 6, further comprising transmitting the RI for the first CC in the CSI report.

8. The method of claim 1, further comprising:
   determining a set of one or more activated CCs among the plurality of CCs,
   wherein transmitting the CSI report comprises transmitting CSI for a CC in the set of activated CCs and dropping CSI for CCs not in the set of activated CCs.

9. The method of claim 1, further comprising:
   multiplexing CSI for two or more CCs in the CSI report according to the priority up to a maximum payload size corresponding to the transmission format.

10. The method of claim 1, further comprising:
    multiplexing the CSI for CCs in the plurality of CCs until all CSI due for transmission in the first subframe is multiplexed or until a maximum payload size is reached.

11. The method of claim 9, wherein the transmission format is associated with a discrete Fourier transform, single-carrier, orthogonal frequency division multiplex (DFT-S-OFDM) waveform.

12. The method of claim 9, wherein the transmission format comprises physical uplink control channel (PUCCH) Format 3 in a long term evolution-advanced (LTE/A) communication system.

13. The method of claim 1, further comprising multiplexing only one CSI type in the CSI report.

14. The method of claim 1, further comprising multiplexing different CSI types in the CSI report.

15. The method of claim 1, wherein determining the priority comprises prioritizing CSI for multiple-input multiple-output (MIMO) component carriers over CSI for single-input single-output (SIMO) component carriers.

16. The method of claim 15, wherein determining the priority further comprises prioritizing the MIMO component carriers according to CSI type, wherein the CSI type comprises one of an RI type, a wideband CQI type, a wideband PMI type, and a sub-band PMI type.

17. The method of claim 1 wherein the configuration includes an index for each CC in the plurality of CCs, and wherein determining the priority comprises ordering the CCs based at least in part on their corresponding indices.

18. The method of claim 9, wherein the CSI report comprises a plurality of CSI types, the method further comprising ordering the CSI in the CSI report according to CSI type up to the maximum payload size.

19. The method of claim 1, wherein determining the priority comprises prioritizing a rank indicator (RI) over any of a wideband CQI report, a wideband PMI report and a sub-band CQI report.

20. The method of claim 1, further comprising multiplexing one or more additional CSI reports with the CSI report in the first subframe according to the priority up to a maximum payload size for CSI reports in the first subframe.

21. The method of claim 1, wherein the plurality of CCs comprises one or more activated CCs and one or more deactivated CCs, the method further comprising:
    dropping CSI for the one or more deactivated CCs; and
    multiplexing CSI for the one or more activated CCs according to the priority up to a maximum payload size.

22. The method of claim 1, wherein the plurality of CCs comprises one or more activated CCs and one or more deactivated CCs, the method further comprising multiplexing CSI for the one or more activated CCs and a predetermined pattern for the one or more deactivated CCs, up to a maximum payload size.

23. A wireless communication apparatus, comprising:
    a processor; and
    a memory comprising processor executable instructions that, when executed by the processor, configure the processor to:
    determine a configuration for reporting channel state information (CSI) for each component carrier (CC) in a plurality of CCs based on a radio resource control (RRC) message;

determine a priority, for a first subframe, for transmitting CSI associated with each of one or more of the CCs in the plurality of CCs based on at least one of: the configuration, a CSI report type, or a carrier index;

determine a payload size available in a physical uplink control channel (PUCCH) for reporting CSI in the first subframe, wherein the payload size available in the PUCCH depends upon a transmission format used for the first subframe;

determine whether CSI for one or more CCs of the plurality of CCs collide with each other in the first subframe; and transmit a CSI report in the first subframe based on the priority, wherein the CSI for the one or more CCs of the plurality of CCs are transmitted in the CSI report up to the determined payload size available in the PUCCH in response to determining the collision of the CSI for the one or more CCs of the plurality of CCs in the first subframe, wherein the one or more CCs are selected according to the priority, wherein the CSI for the one or more CCs of the plurality of CCs that does not fit within the determined payload size available in the PUCCH is dropped.

24. The wireless communication apparatus of claim 23, wherein the configuration indicates an ordering of CCs in the plurality of CCs and a reporting type for each CC.

25. The wireless communication apparatus of claim 23, wherein the processor is configured to determine the priority by:
determining that CSI for a primary component carrier (PCC) in the plurality of CCs is due for transmission in the first subframe;
determining that CSI for a secondary component carrier (SCC) in the plurality of CCs is due for transmission in the first subframe; and
dropping the CSI for the SCC in the first subframe.

26. The wireless communication apparatus of claim 23, wherein the processor is configured to determine the priority by:
determining that CSI comprising a rank indicator (RI) is due in the first subframe for a first CC in the plurality of CCs;
determining that CSI comprising one of a channel quality indicator (CQI) and a pre-coding matrix indicator (PMI) is due in the first subframe for a second CC in the plurality of CCs; and
dropping the CSI for the second CC in the first subframe.

27. The wireless communication apparatus of claim 23, wherein the processor is further configured to determine a set of one or more activated CCs among the plurality of CCs, and wherein the processor is configured to transmit the CSI report by transmitting CSI for a CC in the set of activated CCs and dropping CSI for CCs not in the set of activated CCs.

28. The wireless communication apparatus of claim 23, wherein the processor is further configured to multiplex CSI for two or more CCs in the CSI report according to the priority up to a maximum payload size for reporting CSI in the first subframe.

29. The wireless communitcation apparatus of claim 23, wherein the processor is further configured to multiplex the CSI for the CCs in the plurality of CCs until all CSI due for transmission in the first subframe is multiplexed or until a maximum payload size is reached.

30. The wireless communication apparatus of claim 23, wherein the processor is configured to determine the priority by prioritizing CSI for multiple-input multiple-output (MIMO) component carriers over CSI for single-input single-output (SIMO) component carriers.

31. The wireless communication apparatus of claim 23, wherein the processor is configured to determine the priority by prioritizing a rank indicator (RI) over any of a wideband CQI report, a wideband PMI report and a sub-band CQI report.

32. The wireless communication apparatus of claim 23, wherein the processor is further configured to multiplex one or more additional CSI reports in the first subframe according to the priority up to a maximum payload size for CSI reports in the first subframe.

33. The wireless communication apparatus of claim 23, wherein the plurality of CCs comprises one or more activated CCs and one or more deactivated CCs, and wherein the processor is further configured to drop the CSI for the one or more deactivated CCs and to multiplex CSI for the one or more activated CCs according to the priority up to a maximum payload size.

34. The wireless communication apparatus of claim 23, wherein the plurality of CCs comprises one or more activated CCs and one or more deactivated CCs, and wherein the processor is further configured to multiplex CSI for the one or more activated CCs and a predetermined pattern for the one or more deactivated CCs up to a maximum payload size.

35. An apparatus, comprising:
means for determining a configuration for reporting channel state information (CSI) for each component carrier (CC) in a plurality of CCs based on a radio resource control (RRC) message;
means for determining a priority, for a first subframe, for transmitting CSI associated with each of one or more of the CCs in the plurality of CCs based on at least one of: the configuration, a CSI report type, or a carrier index;
means for determining a payload size available in a physical uplink control channel (PUCCH) for reporting CSI in the first subframe, wherein the payload size available in the PUCCH depends upon a transmission format used for the first subframe;
means for determining whether CSI for one or more CCs of the plurality of CCs collide with each other in the first subframe; and
means for transmitting a CSI report in the first subframe based on the priority, wherein the CSI for the one or more CCs of the plurality of CCs are transmitted in the CSI report up to the determined payload size available in the PUCCH in response to determining the collision of the CSI for the one or more CCs of the plurality of CCs in the first subframe, wherein the one or more CCs are selected according to the priority, wherein the CSI for the one or more CCs of the plurality of CCs that does not fit within the determined payload size available in the PUCCH is dropped.

36. The apparatus of claim 35, wherein the configuration indicates an ordering of CCs in the plurality of CCs and a reporting type for each CC.

37. The apparatus of claim 35, further comprising:
means for determining a set of one or more activated CCs among the plurality of CCs,
wherein the means for transmitting the CSI report comprises means for transmitting CSI for a CC in the set of activated CCs and means for dropping CSI for CCs not in the set of activated CCs.

38. The apparatus of claim 35, further comprising means for multiplexing CSI for two or more CCs in the CSI report according to the priority up to a maximum payload size for reporting CSI in the first subframe.

39. The apparatus of claim 35, further comprising means for multiplexing the CSI for CCs in the plurality of CCs until all CSI due for transmission in the first subframe is multiplexed or until a maximum payload size is reached.

40. The apparatus of claim 35, further comprising means for multiplexing one or more additional CSI reports with the CSI report in the first subframe according to the priority up to a maximum payload size for CSI reports in the first subframe.

41. The apparatus of claim 35, wherein the plurality of CCs comprises one or more activated CCs and one or more deactivated CCs, the apparatus further comprising:
   means for dropping the CSI for the one or more deactivated CCs; and
   means for multiplexing CSI for the one or more activated CCs according to the priority up to a maximum payload size.

42. The apparatus of claim 35, wherein the plurality of CCs comprises one or more activated CCs and one or more deactivated CCs, the apparatus further comprising:
   means for multiplexing CSI for the one or more activated CCs and a predetermined pattern for the one or more deactivated CCs up to a maximum payload size.

43. An article of manufacture, comprising a non-transitory machine-readable medium having instructions therein that, when executed by a machine, configures the machine to:
   determine a configuration for reporting channel state information (CSI) for each component carrier (CC) in a plurality of CCs based on a radio resource control (RRC) message;
   determine a priority, for a first subframe, for transmitting CSI associated with each of one or more of the CCs in the plurality of CCs based on at least one of: the configuration, a CSI report type, or a carrier index;
   determine a payload size available in a physical uplink control channel (PUCCH) for reporting CSI in the first subframe, wherein the payload size available in the PUCCH depends upon a transmission format used for the first subframe;
   determine whether CSI for one or more CCs of the plurality of CCs collide with each other in the first subframe; and
   transmit a CSI report in the first subframe based on the priority, wherein the CSI for the one or more CCs of the plurality of CCs are transmitted in the CSI report up to the determined payload size available in the PUCCH in response to determining the collision of the CSI for the one or more CCs of the plurality of CCs in the first subframe, wherein the one or more CCs are selected according to the priority, wherein the CSI for the one or more CCs of the plurality of CCs that does not fit within the determined payload size available in the PUCCH is dropped.

44. The article of manufacture of claim 43, wherein the configuration indicates an ordering of CCs in the plurality of CCs and a reporting type for each CC.

45. The article of manufacture of claim 43, wherein the machine is further configured to multiplex one or more additional CSI reports with the CSI report in the first subframe according to the priority up to a maximum payload size for CSI reports in the first subframe.

46. A method of wireless communication, comprising:
   configuring a user equipment for a transmission format used for a first subframe, wherein a payload size available in a physical uplink control channel (PUCCH) to the user equipment for reporting a channel state information (CSI) in the first subframe depends upon the transmission format;
   determining a CSI reporting configuration comprising information for prioritizing, for the first subframe, CSI among a plurality of component carriers (CCs) configured for the user equipment, wherein the prioritizing comprises an ordering based on at least one of a CSI report type, or a carrier index;
   transmitting the CSI reporting configuration to the user equipment in one or more radio resource control (RRC) messages; and
   receiving, from the user equipment, one or more CSI reports comprising CSI for one or more CCs of the plurality of CCs prioritized in accordance with the CSI reporting configuration, wherein the CSI for the one or more CCs of the plurality of CCs are transmitted in the CSI report up to the payload size available in the PUCCH in response to the CSI for the one or more CCs of the plurality of CCs being determined to collide with each other in the first subframe, wherein the one or more CCs are selected according to the prioritizing, wherein the CSI for the one or more CCs of the plurality of CCs that does not fit within the determined payload size available in the PUCCH is dropped.

47. A wireless communications apparatus, comprising:
   a processor; and
   a memory comprising processor executable instructions that, when executed by the processor, configures the processor to:
   configure a user equipment for a transmission format used for a first subframe, wherein a payload size available in a physical uplink control channel (PUCCH) to the user equipment for reporting a channel state information (CSI) in the first subframe depends upon the transmission format;
   determine a CSI reporting configuration comprising information for prioritizing, for the first subframe, CSI among a plurality of component carriers (CCs) configured for the user equipment, wherein the prioritizing comprises an ordering based on at least one of a CSI report type, or a carrier index;
   transmit the CSI reporting configuration to the user equipment in one or more radio resource control (RRC) messages; and
   receive, from the user equipment, one or more CSI reports comprising CSI for one or more CCs of the plurality of CCs prioritized in accordance with the CSI reporting configuration, wherein the CSI for the one or more CCs of the plurality of CCs are transmitted in the CSI report up to the payload size available in the PUCCH in response to the CSI for the one or more CCs of the plurality of CCs being determined to collide with each other in the first subframe, wherein the one or more CCs are selected according to the prioritizing, wherein the CSI for the one or more CCs of the plurality of CCs that does not fit within the determined payload size available in the PUCCH is dropped.

48. An apparatus, comprising:
   means for configuring a user equipment for a transmission format used for a first subframe, wherein a payload size available in a physical uplink control channel (PUCCH) to the user equipment for reporting a channel state information (CSI) in the first subframe depends upon the transmission format;
   means for determining a CSI reporting configuration comprising information for prioritizing, for the first subframe, CSI among a plurality of component carriers (CCs) configured for the user equipment, wherein the prioritizing comprises an ordering based on at least one of a CSI report type, or a carrier index;

means for transmitting the CSI reporting configuration to the user equipment in one or more radio resource control (RRC) messages; and means for receiving, from the user equipment, one or more CSI reports comprising CSI for one or more CCs of the plurality of CCs prioritized in accordance with the CSI reporting configuration, wherein the CSI for the one or more CCs of the plurality of CCs are transmitted in the CSI report up to the payload size available in the PUCCH in response to the CSI for the one or more CCs of the plurality of CCs being determined to collide with each other in the first subframe, wherein the one or more CCs are selected according to the prioritizing, wherein the CSI for the one or more CCs of the plurality of CCs that does not fit within the determined payload size available in the PUCCH is dropped.

49. An article of manufacture, comprising a non-transitory machine-readable medium having instructions therein that, when executed by a machine, configures the machine to:

configure a user equipment for a transmission format used for a first subframe, wherein a payload size available in a physical uplink control channel (PUCCH) to the user equipment for reporting a channel state information (CSI) in the first subframe depends upon the transmission format;

determine a CSI reporting configuration comprising information for prioritizing, for the first subframe, CSI among a plurality of component carriers (CCs) configured for the user equipment, wherein the prioritizing comprises an ordering based on at least one of a CSI report type, or a carrier index;

transmit the CSI reporting configuration to the user equipment in one or more radio resource control (RRC) messages; and receive, from the user equipment, one or more CSI reports comprising CSI for one or more CCs of the plurality of CCs prioritized in accordance with the CSI reporting configuration, wherein the CSI for the one or more CCs of the plurality of CCs are transmitted in the CSI report up to the payload size available in the PUCCH in response to the CSI for the one or more CCs of the plurality of CCs being determined to collide with each other in the first subframe, wherein the one or more CCs are selected according to the prioritizing, wherein the CSI for the one or more CCs of the plurality of CCs that does not fit within the determined payload size available in the PUCCH is dropped.

* * * * *